United States Patent [19]

Haraveth et al.

[11] Patent Number: 4,880,536

[45] Date of Patent: Nov. 14, 1989

[54] FILTER ASSEMBLY OF A MANIFOLD, MOUNTING RING AND FILTER HOUSING

[75] Inventors: Garry R. Haraveth, Cortland; Robert J. Catterfeld, Homer, both of N.Y.; Benjamin Trasen, Littleton, Colo.

[73] Assignee: Pall Corporation, Glen Cove, N.Y.

[21] Appl. No.: 50,013

[22] Filed: May 15, 1987

[51] Int. Cl.⁴ .......................................... B01D 27/08
[52] U.S. Cl. ................................. 210/232; 210/440; 210/444; 210/446; 210/450; 210/451; 210/453; 210/455; 210/500.1; 55/502; 55/503; 55/504
[58] Field of Search ............... 210/232, 249, 440, 443, 210/444, 446, 450, 451, 453, 455, 500.1; 55/502, 503, 504

[56] References Cited

U.S. PATENT DOCUMENTS

| | | | |
|---|---|---|---|
| 1,185,309 | 5/1916 | Haeseler | 210/232 |
| 2,957,235 | 3/1957 | Steinberg | 29/424 |
| 3,240,342 | 11/1961 | Callahan, Jr. et al. | 210/232 |
| 3,415,382 | 12/1968 | Martin | 210/440 |
| 3,557,957 | 1/1971 | Baldwin | 210/443 |
| 3,782,083 | 1/1974 | Rosenberg | 55/491 |
| 3,950,251 | 4/1976 | Hiller | 210/440 |
| 3,993,561 | 11/1976 | Swearinger | 210/131 |
| 4,052,307 | 10/1977 | Humbert, Jr. | 210/444 |
| 4,266,955 | 5/1981 | Hackney | 55/412 |
| 4,336,043 | 6/1982 | Aonuma et al. | 55/483 |
| 4,371,439 | 2/1983 | Thornton | 210/443 |
| 4,465,595 | 8/1984 | Cooper | 210/238 |
| 4,544,387 | 10/1985 | Agerlid | 55/274 |
| 4,632,682 | 12/1986 | Erdmannsdorfer | 55/498 |
| 4,632,687 | 12/1986 | Kunkle et al. | 65/135 |

OTHER PUBLICATIONS

"Mass Flow Control for Critical Process Requirements", Microelectronic Manufacturing and Testing, Apr. 1985.

"Mass Flow Controllers: Assuring Precise Process Gas Flows", Semiconductor International, Oct. 1985 Millipore Catalogue; UnitInstruments Catalogue.

Primary Examiner—Richard V. Fisher
Assistant Examiner—Wanda L. Millard
Attorney, Agent, or Firm—Leydig, Voit & Mayer

[57] ABSTRACT

The disclosure describes a filter assembly comprising a manifold, a filter housing, a hollow, generally cylindrical filter element disposed within the filter housing, and a mounting ring operatively associated with the manifold and the filter housing for detachably mounting the filter housing to the manifold. The manifold includes first and second ports. The filter housing includes a side wall and an end wall having first and second spaced openings and a bore. The filter element is spaced from the side wall of the filter housing and includes and end cap. The end cap is disposed in the bore of the end wall of the filter housing and has an opening which communicates with the interior of the hollow filter element. The first opening of the filter housing comunicates with the space between the filter element and the side wall of the filter housing, the second opening of the filter housing communicates with the central opening of the filter element, and the first and second ports of the manifold respectively communicate with the first and second openings of the filter housing.

20 Claims, 1 Drawing Sheet

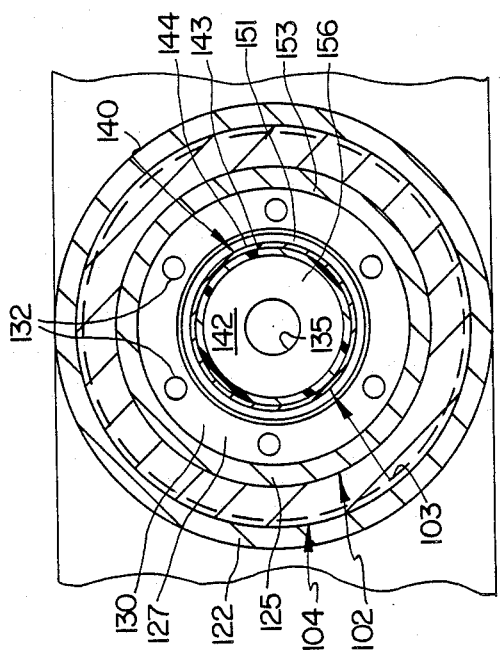
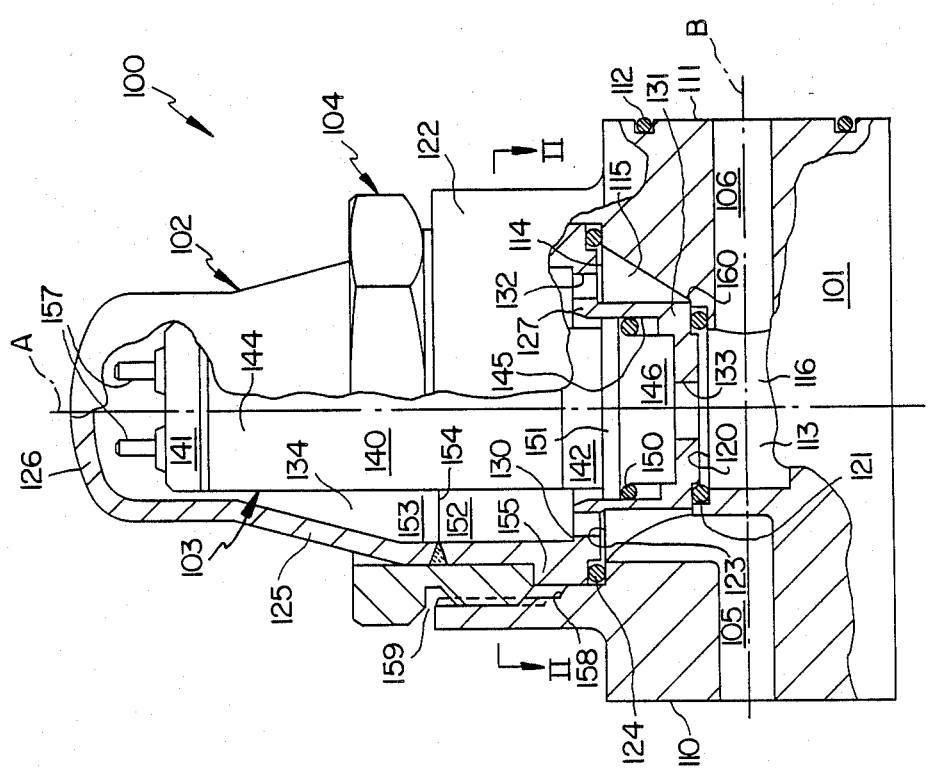

FILTER ASSEMBLY OF A MANIFOLD, MOUNTING RING AND FILTER HOUSING

TECHNICAL FIELD

The present invention relates to filter assemblies and, in particular, to filter assemblies with replaceable filters

DISCLOSURE OF THE INVENTION

The present invention provides a filter assembly comprising a manifold, a filter housing, a hollow, generally cylindrical filter element, and a mounting ring. The manifold includes first and second ports. The filter housing includes a side wall and an end wall having first and second spaced openings and a cylindrical protrusion containing a bore. The filter element is disposed within the filter housing spaced from the side wall and includes an end cap. The end cap is disposed within the bore in the end wall of the filter housing and has an opening which communicates with the interior of the hollow filter element The first opening of the filter housing communicates with the space between the side wall and the filter element, and the second opening of the filter housing communicates with the opening of the filter element. The mounting ring is operatively associated with the filter housing and the manifold for detachably mounting the filter housing to the manifold with the first and second ports of the manifold respectively communicating with the first and second openings of the filter housing.

The present invention also provides a filter assembly comprising a manifold, a generally cylindrical filter housing, a hollow, generally cylindrical filter element, and a mounting ring. The manifold has a cavity, first and second ports communicating with the cavity, and a threaded collar positioned around the cavity. The filter housing has a side wall, a blind end wall, and an open end wall. The side wall has a outwardly extending circumferential shoulder positioned near the open end wall. The open end wall has first and second openings, an annular section containing the first opening, and a cylindrical protrusion extending concentrically from the annular section and containing a central bore and the second opening. The filter element includes a blind end cap and an open cap. The open end cap has a generally cylindrical projection with a central opening which communicates with the interior of the hollow filter element. The filter element is permanently sealed within the filter housing, spaced from the side wall, and movable between a first position wherein the blind end cap abuts the blind end wall and a second position wherein the blind end cap is spaced from the blind end wall. The cylindrical projection of the open end cap is sealed against and slideably positioned within the bore of the open end wall with the first opening in the open end wall communicating with the space between the side wall and the filter and the second opening in the open end wall communicating with the central opening in the open end cap of the filter element. The mounting ring abuts the circumferential shoulder of the filter housing and is threaded to the collar of the manifold.

The present invention further provides a filter assembly comprising a generally cylindrical filter housing and a hollow filter element disposed within the filter housing. The filter housing includes a side wall and an end wall. The side wall has an outwardly extending circumferential shoulder disposed near the end wall. The end wall has first and second openings, an annular section containing the first opening, and a cylindrical protrusion extending concentrically from the annular section and containing a central bore and the second opening. The filter element includes an end cap having a generally cylindrical projection with a central opening which communicates with the interior of the filter element. The filter element is disposed within the filter housing spaced from the side wall. The cylindrical projection on the end cap of the filter element is positioned within the bore on the end wall of the filter housing with the first opening in the end wall communicating with the space between the side wall and the filter element and second opening in the end wall communicating with the central opening in the end cap.

BRIEF DESCRIPTION OF THE DRAWINGS

In the accompanying drawings:

FIG. 1 is a partial sectional view of a filter assembly embodying the present invention, and FIG. 2 is a sectional plan view of the filter assembly of FIG. 1 as seen along lines II—II.

EXEMPLARY MODE FOR CARRYING OUT THE INVENTION

A filter assembly embodying the invention can be used in a variety of applications For example, the filter assembly may be used in combination with an instrument such as a mass flow meter, a mass flow controller, or a pressure controller to provide an ultraclean fluid.

As shown in FIG. 1, an exemplary fluid assembly 100 embodying the invention generally comprises a manifold 101, a filter housing 102, a filter element 103, and a mounting ring 104. The manifold 101 may be fabricated from any suitable, impervious material, including a thermoplastic or a metal such as stainless steel, and may be fashioned in any appropriate configuration, including a generally rectangular block. The manifold 101 includes an inlet port 105 and an outlet port 106 which respectively open onto an inlet surface 110 and an outlet surface 111.

Communicating with the inlet port 105 or the outlet port 106, an instrument (not shown) or an adapter (not shown) may be directly connected by threaded connectors (not shown) to the inlet surface 110 or the outlet surface 111 of the manifold 101. The instrument or the adapter, in turn, would then communicate with the remainder of the fluid system (not shown). A seal, such as the O-ring 112 on the outlet surface 111 of the manifold or a similar seal on the instrument or adapter, prevents fluid leakage. While directly connecting the manifold 101 to the instrument or the adapter conserves space and facilitates a more compact design, either the inlet port 105 or the outlet port 106, or both, may include a suitable coupling, e.g., a threaded male or female coupling, for connecting the manifold 101 to the instrument or the remainder of the fluid system.

In the exemplary filter assembly 100, the inlet and outlet ports 105, 106 communicate with a cavity 113 which opens onto a mounting surface 114 of the manifold 101. The cavity 113 includes an upper chamber 115 which tapers to a narrower lower chamber 116, the inlet and outlet ports 105, 106 respectively communicating with the upper and lower chambers 115, 116. An annular lower flat 120 is formed at the junction of the upper and lower chambers 115, 116, and a lower seal 121, such as an elastomeric O-ring or a metal C-ring, rests on the lower flat 120. Circumscribing the cavity 113, an internally threaded collar 122 extends outwardly from the mounting surface 114 of the manifold 101. An annular upper flat 123 is formed between the collar 122 and the cavity 113, and an upper seal 124, such as an elastomer O-ring or a metal C-ring, rests on the upper flat 123. While the inlet and outlet ports 105, 106 of the exemplary filter assembly 100 communicate with the cavity 113, the manifold 101 may be differently configured. For example, the inlet and outlet ports 105, 106 may separately open onto the mounting surface 114 within the upper seal 124.

The filter housing 102 is disposed on the mounting surface 114 of the manifold 101 within and circumjacent to the collar 122. The filter housing may be fabricated from any suitable, impervious material, including a thermoplastic or a metal such as stainless steel, and may be fashioned in any appropriate configuration, including a generally cylindrical configuration.

The filter housing 102 includes a side wall 125, a blind end wall 126 preferably integrally formed with the side wall 125, and an open end wall 127 also preferably integrally formed with the side wall 125. Although the open end wall 127 may be variously configured, in the exemplary filter assembly 100, the open end wall 127 comprises an outer, generally annular section 130 circumscribing an inner cylindrical protrusion 131, which extends concentrically from the annular section 130 in accordance with one aspect of the invention. The annular section 130 faces the upper flat 123 on the manifold 101 and seats the upper seal 124 against the upper flat 123, sealing the upper chamber 115 from the exterior of the exemplary filter assembly 100. The cylindrical protrusion 131 is disposed within the cavity 113 of the manifold 101 and seats the lower seal 121 against the lower flat 120, sealing the upper chamber 115 from the lower chamber 116.

To permit fluid flow through the filter housing 102, the open end wall 127 also includes inlet and outlet openings 132, 133. In the exemplary filter assembly 100, the annular section 130 includes several inlet openings 132 communicating between the upper chamber 115 and a space 134 between the filter element 103 and the side wall 125 of the filter housing 102. The outlet opening 133 is centrally positioned in the cylindrical protrusion 131 and communicates between the lower chamber 116 and a central opening 135 in the filter element 103.

The filter element may be fabricated from any suitable material, including a metal, and may be fashioned in any appropriate configuration, including a solid, porous structure through which the fluid flows axially. In the exemplary fluid assembly 100, the filter element 103 is fashioned from a thermoplastic material and has a hollow, generally cylindrical configuration including a microporous side wall 140, a blind end cap 141 mounted to one end of the side wall 140, and an open end cap 142 mounted to the opposite end of the side wall 140. The side wall 140 may be variously formed, for example, with an outer perforated cage, with a pleated, sintered metal, metal screen or microfibrous filter medium for removing particulate matter, or with a sorbing material for absorbing or adsorbing one or more substances from the fluid. However, the side wall 140 of the exemplary filter assembly 100 preferably comprises a perforated core 143 and a filter medium 144 including a microporous polytetrafluoroethylene membrane wrapped around the core 143. The filter medium 144 preferably has an absolute pore rating for gases in the range of from about 1.0 micron to about 0.01 micron. For example, the microporous, polytetrafluoroethylene membrane of the exemplary filter assembly 100 preferably has an absolute pore rating for gases of about 0.01

The filter element may be disposed within the filter housing in any manner suitable for defining a fluid flow path from the inlet opening of the filter housing through the filter element to the outlet opening of the filter housing. In the exemplary filter assembly 100, the side wall of the filter housing 102 preferably tapers inward near the blind end wall 126 to prevent undue lateral motion of the filter element 103 at the blind end cap 141. Further, the open end wall 127 of the filter housing 102 includes a bore 145 preferably formed in the cylindrical protrusion 131, and the open end cap 142 of the filter element 103 includes a cylindrical projection 146 which is disposed within the bore 145, in accordance with another aspect of the invention. A seal 150, such as an elastomeric O-ring, is disposed about the cylindrical projection 146. The seal 150 between the cylindrical projection 146 of the filter element 103 and the interior of the bore 145 of the filter housing 102 prevents fluid from bypassing the filter element 103. A flange 151 on the open end cap 142 limits the travel of the seal 150 along the cylindrical projection 146.

Although the filter housing 102 may be configured so that the filter element 103 is removably disposed within the filter housing 102, the filter element 103 is preferably permanently sealed within the filter housing 102. For example, the side wall 125 of the filter housing 102 of the exemplary filter assembly 100 includes first and second portions 152, 153 joined at a circumferential joint 154. After the filter element 103 has been mounted to the open end wall 127 of the filter housing 102 by slipping the seal 150 over the cylindrical projection 146 and then inserting the cylindrical projection 146 into the bore 145, the second portion 153 of the filter housing 102 is fitted to the first portion 152. The two portions 152, 153 are then joined, preferably by welding. The circumferential joint 154 is spaced from the open end wall 127 of the filter housing 102 a distance along the side wall 125 sufficient to prevent the heat generated during welding from damaging the thermoplastic filter element 103.

The filter housing 102 and the filter element 103 may be detachably mounted to the manifold 101 in any suitable manner. Preferably, they are mounted to the manifold 101 with the axis A of the filter element 103 generally perpendicular to a line B interconnecting the inlet and outlet ports 105, 106 at the inlet and outlet surfaces 110, 111. Since this construction allows longer filter housings and filter elements to be used without increasing the distance between the inlet and outlet surfaces 110, 111 of the manifold 101, it is particularly advantageous where in-line space is limited.

In the exemplary filter assembly 100, a mounting ring 104 serves to detachably mount the filter housing 102 to the manifold 101. The mounting ring 104 of the exemplary filter assembly 100 comprises an externally threaded sleeve having a hexagonal head. The lower end of the mounting ring 104 abuts a shoulder 155 formed on the side wall 125 of the filter housing 102 near the open end wall 127. Once the cylindrical protrusion 131 of the filter housing 102 is inserted into the cavity 113 of the manifold 101, the mounting ring 104 may be slipped over the blind end wall 126 and the side wall 125 of the filter housing 102 and then threaded to the internally threaded collar 122 of the manifold 101. While the mounting ring 104 of the exemplary filter assembly 100 may be detached from both the manifold 101 and the filter housing 102 and is externally threaded, the mounting ring may be differently configured. For example, the mounting ring may be permanently attached to either the filter housing or the manifold and may have internal threads which mate with an externally threaded collar.

In the preferred mode of operation, fluid enters the inlet port 105 at the inlet surface 110 of the manifold 101 of the exemplary filter assembly 100. The fluid passes along the inlet port 105 to the annular upper chamber 115 and then through the inlet openings 132 in the open end wall 127 of the filter housing 102 into the space 134 between the side wall 125 of the filter housing 102 and the filter element 103. From the space 134 in the filter housing 102, the fluid passes radially through the side wall 140 of the filter element 103, where the filter medium 144 removes undesirable particulate matter, into the interior 156 of the filter element 103. The filtered fluid then passes through the central opening 135 in the open end cap 142 of the filter element 103 through the outlet opening 133 in the open end wall 127 of the filter housing 102 into the lower chamber 116 of the manifold 101. From the lower chamber 116, the filtered fluid exits the exemplary filter assembly 100 through the outlet port 106.

The exemplary filter assembly 100 is preferably designed to minimize contamination by toxic or otherwise harmful substances. For example, the surfaces of the manifold 101 and the filter housing 102 which are exposed to fluid flowing through the exemplary filter assembly 100 are preferably finely finished and highly polished. This minimizes the accumulation of such harmful substances on the exposed surfaces. Further, the design of the exemplary filter assembly 100 essentially eliminates holdup areas which can trap fluids such as gases. Holdup areas frequently arise where there is close surface-to-surface contact between components of a filter assembly, e.g., at mating threaded portions. Toxic fluids being filtered may migrate between the closely contacting surfaces and resist flashing. With the upper seal 124 of the exemplary filter assembly 100 disposed between the fluid being filtered and the threaded connection between the mounting ring 104 and the collar 122, the fluid is presented with virtually no holdup areas.

In accordance with another aspect of the invention, the bore 145 in the open end wall 127 of the filter housing 102, the open end cap 142 of the filter element 103, and the seal 150 are dimensioned to allow the filter element 103 and the seal 150 to slide along the bore 145 without lessening the effectiveness of the seal between the filter element 103 and the filter housing 102. Further, the blind end cap 141 includes two pins 157 which extend toward the blind end wall 126 of the filter housing 102. During normal forward pressure operation, the open end cap 142 of the filter element 103 is forced fully into the bore 145 of the filter housing 102, leaving a space between the blind end wall 126 and the pins 157 on the blind end cap 141. During reverse pressure surges, the open end cap 142 is forced outwardly along the bore 145 until the pins 157 abut the blind end wall 126. The pins 157 are preferably dimensioned to prevent the flange 151 on the open end cap 142 from escaping the bore 145. Because the filter element 103 can slide within the filter housing 102 without losing the seal between them, the filter housing 102 and the filter element 103 can be machined to much less rigid tolerances than those required to perfectly fit the filter element 103 between the blind end wall 126 and the open end wall 127 of the filter housing 102. Further, the less rigid tolerances better accommodate the differences in thermal expansion between the metal filter housing 102 and the thermoplastic filter element 103.

In accordance with a further aspect of the invention, the filter element 103 may be quickly and safely replaced when it becomes fouled or if it fails. Once any toxic fluids have been flushed from the exemplary filter assembly 100 and fluid flow is interrupted, the mounting ring 104 is unscrewed from the collar 122 and the filter housing 102 is simply separated from the manifold 101. Since the filter element 103 is continued within the filter housing 102, residual toxic or otherwise harmful substances remain within the old filter housing 102 and filter element 103 as they are removed.

Once the used filter housing 102 has been removed, a new filter housing 102 containing a clean filter element 103 is then mounted to the manifold 101 with the cylindrical protrusion 131 of the filter housing 102 inserted into the cavity 113 of the manifold 101. The tapered upper chamber 115 and a tapered internal ledge 158 on the collar 122 aid in guiding the new filter housing 102, as well as the lower and upper seals 121, 124 into position. With the design of the exemplary filter assembly 100, it is virtually impossible to mount the filter assembly 102 backward onto the manifold 101. Further, with the filter element 103 permanently sealed within the filter housing 102, it is virtually impossible to damage the fragile microporous membrane of the filter element 103 as the new filter housing 102 and filter element 103 are being mounted to the manifold 101.

Once the new filter housing 102 has been mounted to the manifold 101, the mounting ring 104 is then screwed back onto the collar 122. To prevent undue force from damaging the upper and lower seals 124, 121 as the mounting ring 104 is tightened onto the collar 122, a shoulder 160 is formed on the manifold 101 slightly above the lower flat 120. The end of the cylindrical protrusion 131 of the open end wall 127 bottoms out on the shoulder 160 as the mounting ring 104 is tightened in place, preventing the lower and upper seals 121, 124 from being overcompressed. In addition, both the annular section 130 and the end of the cylindrical protrusion 131 of the open end wall 127 are provided with reliefs directly above the upper and lower seals 124, 121.

When the mounting ring 104 has been tightened onto the collar 122 sufficient to bottom the cylindrical protrusion 131 of the filter housing 102 onto the shoulder 160 of the manifold 101, a gap 159 remains between the bottom of the hexagonal head of the mounting ring 104 and the top of the collar 122 of the manifold 101, his gap may be used as a standard for detecting the adequacy of the seal between the filter housing 102 and the manifold 101. For example, if the gap 159 is one-sixteenth of an inch when the filter housing 102 is properly bottomed onto the manifold 101, then a gap larger than one-sixteenth of an inch indicates that the lower and upper seals 121, 124 have not been adequately compressed and a gap less than one-sixteenth of an inch indicates that the lower and upper seals 121, 124 have been overcompressed.

Once the new filter housing 102 and filter element 103 are properly in place, fluid flow may be resumed. Thus, the filter element 103 of the exemplary filter assembly 100 may be replaced by breaking only a single connection, i.e., the threaded connection between the mounting ring 104 and the collar 122 of the manifold 101. The two connections mounting the manifold 101 to the monitoring instrument not shown and the adapter (not shown) are not broken. Where system integrity is vital and each broken connection must be checked by such expensive procedures as helium leak testing, a filter assembly embodying the present invention provides a more reliable and more economical system.

The invention has been described in terms of an exemplary embodiment However, it is not limited to this embodiment. Alternative embodiments and modifications which would still be encompassed by the invention may be made by those skilled in the art, particularly in light of the foregoing teachings. For example, while the exemplary filter assembly 100 is configured for outside-in flow through the filter element 103, it may alternatively be configured for inside-out flow through the filter element. Therefore, the following claims are intended to cover any alternative embodiments, modifications, or equivalents which may be included within the spirit and scope of the invention

We claim:

1. A filter assembly comprising a manifold including first and second ports; a filter housing including a side wall and an end wall having first and second spaced openings and a cylindrical protrusion containing a bore; a hollow, generally cylindrical filter element disposed within the filter housing spaced from the side wall and including an end cap which has an opening communicating with the interior of the hollow filter element and is disposed in the bore of the filter housing, the first opening of the filter housing communicating with the space between the side wall and the filter element and the second opening of the filter housing communicating with the opening in the end cap; and a mounting ring operatively associated with the filter housing and the manifold for detachably mounting the filter housing to the manifold with the first and second ports of the manifold respectively communicating with the first and second openings of the filter housing.

2. The filter assembly of claim 1 wherein the mounting ring is not fixedly connected to the filter housing.

3. The filter assembly of claim 1 wherein the manifold includes an internally threaded collar and the mounting ring includes an externally threaded portion.

4. The filter assembly of claim 1 wherein the filter housing includes a shoulder and the mounting ring includes a portion which abuts against the shoulder.

5. The filter assembly of claim 1 wherein the manifold includes a cavity and wherein the end wall of the filter housing includes a cylindrical protrusion sealingly disposed within the cavity, the second opening of the filter housing being disposed in the cylindrical protrusion.

6. The filter assembly of claim 5 wherein the cylindrical protrusion of the filter housing divides the cavity of the manifold into first and second chambers, the first chamber communicating between the first port of the manifold and the first opening of the filter housing and the second chamber communicating between the second port of the manifold and the second opening of the filter housing.

7. The filter assembly of claim 5 wherein the end wall of the filter housing includes an annular section circumjacent to the cylindrical protrusion and sealingly disposed against the manifold, the first opening of the filter housing being disposed in the annular section.

8. A filter assembly comprising a generally cylindrical filter housing including a side wall and an end wall, the end wall having first and second openings, an annular section containing the first opening, and a cylindrical protrusion extending concentrically from the annular section and containing a central bore and the second opening, and a hollow filter element including an end cap having a generally cylindrical projection with a central opening which communicates with the interior of the filter element, the filter element being disposed within the filter housing spaced from the side wall and the cylindrical projection of the end cap being sealingly positioned within the bore of the end wall with the first opening in the end wall communicating with the space between the side wall and the filter element and the second opening in the end wall communicating with the central opening in the end cap of the filter element.

9. The filter assembly of claim 8 wherein the central bore of the end wall of the filter housing is positioned concentrically within the cylindrical protrusion of the end wall.

10. The filter assembly of claim 8 further comprising an O-ring seal disposed around the cylindrical projection of the end cap between the filter element and the filter housing.

11. The filter assembly of claim 8 wherein the filter element includes a microporous filter medium having an absolute pore rating of about 0.01 micrometer.

12. The filter assembly of claim 11 wherein the filter medium comprises a microporous polytetrafluoroethylene membrane.

13. The filter assembly of claim 8 wherein the filter element is permanently sealed within the filter housing.

14. The filter assembly of claim 13 wherein the end cap of the filter element is disposed adjacent to the end wall of the filter housing and wherein the side wall of the filter housing includes first and second metal sections welded together at a circumferential joint, the welded joint being spaced from the end wall a distance along the side wall which is sufficient to prevent damage to the filter element from the heat of welding.

15. A filter assembly comprising a manifold having a cavity, fist and second ports communicating with the cavity, and a threaded collar disposed around the cavity; a generally cylindrical filter housing including a side wall, a blind end wall, and an open end wall, the side wall having an outwardly extending circumferential shoulder disposed near the open end wall and the open end wall having first and second openings, an annular section containing the first opening, and a cylindrical protrusion extending concentrically from the annular section and containing the second opening and a central bore; a hollow, generally cylindrical filter element including a blind end cap and an open end cap having a generally cylindrical projection with a central opening which communicates with the interior of the hollow filter element, the filter element being permanently sealed within the filter housing, spaced from the side wall, and movable between a first position wherein the blind end cap abuts the blind end wall and a second position wherein the blind end cap is spaced from the blind end wall and the cylindrical projection of the open end cap being sealingly and slideably positioned within the bore of the open end wall with the first opening in the open end wall communicating with the space between the side wall and the filter element and the second opening in the open end wall communicating with the central opening in the open end cap of the filter element; and a mounting ring abutting the circumferential shoulder of the filter housing and threaded to the collar of the manifold.

16. The filter assembly of claim 15 wherein the central bore of the filter housing is disposed coaxially within the cylindrical protrusion.

17. The filter assembly of claim 16 further comprising at least one seal disposed between the manifold and the filter housing and means for preventing overcompression of the seal.

18. The filter assembly of claim 17 wherein the means for preventing overcompression of the seal includes a shoulder which is disposed on the manifold and abuts the cylindrical protrusion of the filter housing.

19. The filter assembly of claim 18 wherein the mounting ring is externally threaded.

20. The filter assembly of claim 19 wherein the blind end cap of the filter element includes at least one pin extending outwardly toward the blind end wall of the filter housing.

* * * * *